Figure 1:
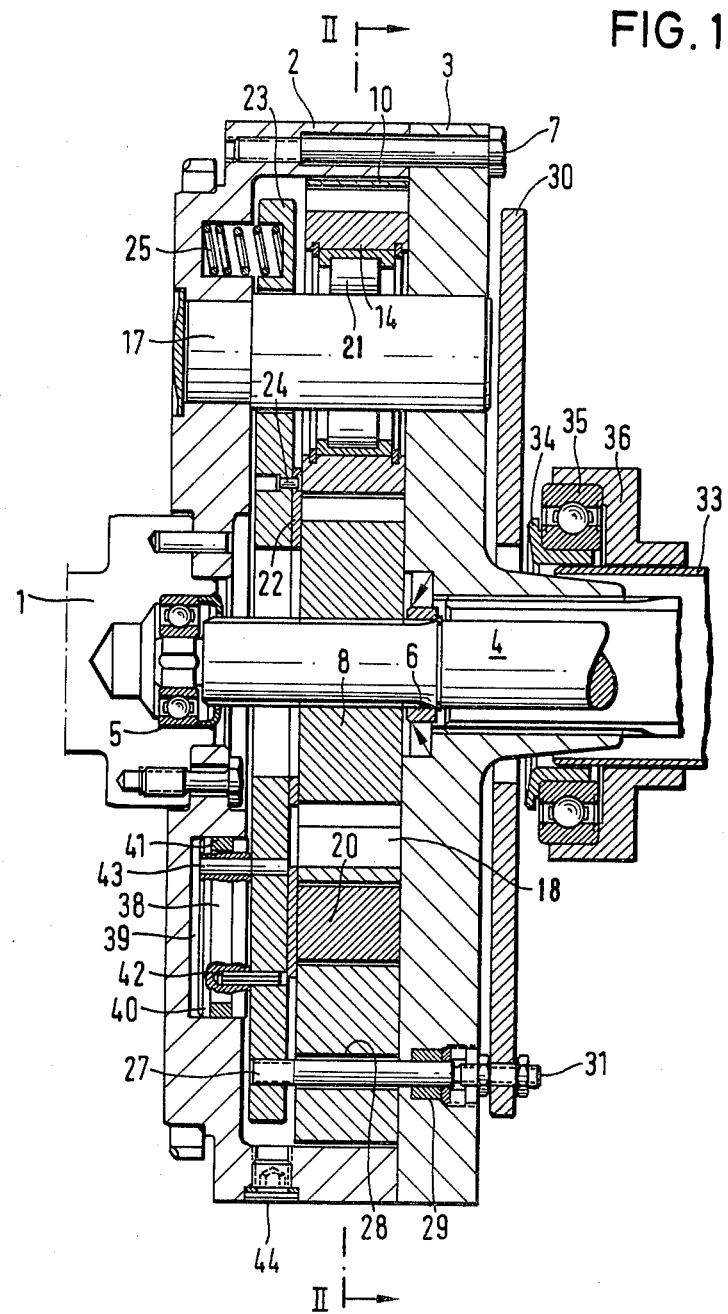

United States Patent [19]

Rosendahl et al.

[11] 4,407,401

[45] Oct. 4, 1983

[54] HYDROSTATIC COUPLING

[75] Inventors: Peter Rosendahl, Düren-Lendersdorf; Karl T. Renius, Bergisch Gladbach, both of Fed. Rep. of Germany

[73] Assignee: Klöckner-Humboldt-Deutz Aktiengesellschaft, Cologne, Fed. Rep. of Germany

[21] Appl. No.: 231,020

[22] Filed: Feb. 3, 1981

[30] Foreign Application Priority Data

Feb. 8, 1980 [DE] Fed. Rep. of Germany ....... 3004581

[51] Int. Cl.$^3$ ............................................ F16D 31/04
[52] U.S. Cl. .................................................... 192/61
[58] Field of Search ......................................... 192/61

[56] References Cited

U.S. PATENT DOCUMENTS

| | | | |
|---|---|---|---|
| 1,883,685 | 10/1932 | Gasterstadt | 192/61 |
| 2,311,237 | 2/1943 | Loveday | 192/61 |
| 2,406,612 | 8/1946 | Landrum | 192/61 |
| 2,559,358 | 7/1951 | Hullhorst et al. | 192/61 X |
| 2,931,472 | 4/1960 | Ahlen | 192/3.2 |

FOREIGN PATENT DOCUMENTS 1084529  6/1960  Fed. Rep. of Germany .

Primary Examiner—Allan D. Herrmann
Attorney, Agent, or Firm—Becker & Becker, Inc.

[57] ABSTRACT

A hydrostatic coupling with a housing fastened on a first coupling shaft. Several gears which operate as geared pumps are contained in recesses of the housing and are arranged in a planetary manner about a gear fastened on a second coupling shaft as a sun gear. The sun gear fastened on the second coupling shaft forms a geared pump with each of the planetary gears driven by the sun gear. The sun gear as well as the planetary gears on the one hand engage against the smooth inner housing wall, and on the other hand engage against a sealing plate which is axially externally adjustable against spring force. This sealing plate, according to axial adjustment, entirely or partially closes the circulation passages of the geared pumps.

9 Claims, 2 Drawing Figures

HYDROSTATIC COUPLING

The present invention relates to a hydrostatic coupling with a housing fastened on a first coupling shaft, with recesses of the housing containing several gears which operate as geared pumps and are arranged in a planetary manner about a gear secured on a second coupling shaft as a sun gear.

German Auslegeschrift No. 10 84 529 Ahlen dated June 30, 1960, and U.S. Pat. No. 2,931,472-Ahlen dated Apr. 5, 1960, both based upon a Swedish priority dated of Aug. 16, 1957, disclose such a hydrostatic coupling, according to which three pairs of gears are arranged as gear pumps in recesses of the housing about a sun gear fastened on the second shaft. Under these circumstances, a gear of every geared pump meshes with the sun gear. The recesses for the three geared pumps are connected on the pressure side by way of a conduit and an adjustable pressure limiting valve with a central chamber in which the sun gear is installed. The central chamber, as well as the recesses connected therewith and the conduits for the geared pumps, are filled with a pressure medium. This known hydrostatic coupling, however, is not shiftable, but rather is adjustable only to a predetermined maximum torque by means of the pressure limiting valves. A further important disadvantage consists in that with this coupling, aside from the driven sun gear for forming each individual pump, additionally two further gears are necessary.

It is therefore an object of the present invention to provide a hydrostatic coupling of the initially outlined type with which the number of rotating pump parts, under essentially the same conditions, is reduced as extensively as possible.

Figure 2:
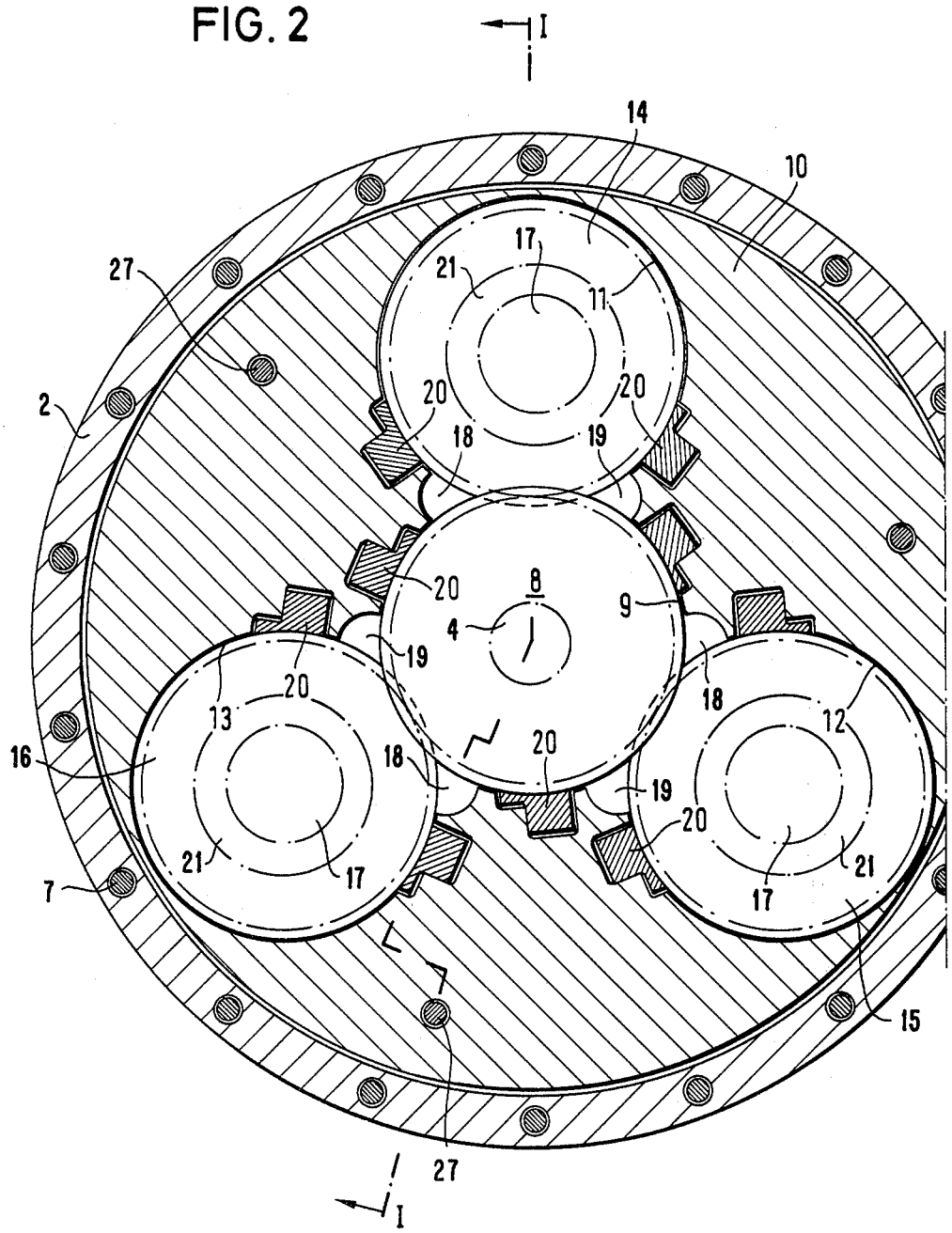

This object, and other objects and advantages of the present invention, will appear more clearly from the following specification in connection with the accompanying drawings, in which:

FIG. 1 is a section through one embodiment of a hydrostatic coupling of the present invention taken along line I—I in FIG. 2; and FIG. 2 is a section taken along line II—II in FIG. 1.

The coupling of the present invention is characterized primarily in that the sun gear fastened on the second coupling shaft forms a geared pump with each of the planetary gears driven thereby.

This arrangement brings about especially the advantage that for each geared pump provided in the coupling, there is saved one gear as well as the journalling, sealing, and the like associated therewith.

According to a further embodiment of the present invention, the sun gear as well as the planetary gears on the one hand engage against the smooth inner housing wall, and on the other hand engage against a sealing plate which is axially externally adjustable against spring force. The sealing plate, after appropriate axial adjustment, entirely or partially closes the circulation passages of the geared pumps. In this connection, for a reliable manner of operation of the sealing plate, it is expedient to fasten this sealing plate to a support plate which is supported by springs in the housing of the coupling.

For uniform axial adjustment of the sealing plate, several push rods or pins are guided in bores through the housing inwardly to the support plate; the push rods or pins engage externally against a common pressure disc or plate for operation.

It is advantageous if, for closing the sealing plate, several working pistons, which are acted on by the operating pressure of the geared pumps, engage this sealing plate in order during operation of the coupling to assure a reliable closure of the sealing plate in the region of the circulating passages of the geared pumps.

So that the geared pumps operate with the best possible efficiency, it is expedient if each of the planetary gears has at least two sealing elements engaging radially thereagainst, and the sun gear has at least three sealing elements engaging radially thereagainst. It has proven expedient if three planetary gears are provided in the coupling, with the radius of these gears coinciding with that of the sun gear.

With a hydrostatic coupling of this type, it is advantageous, for avoiding torque peaks, if at least one pressure limiting valve is provided for the geared pumps.

For the purpose of installing the coupling in the most spacesaving manner in a vehicle, it is furthermore advantageous if the flywheel of the corresponding prime mover or engine is embodied as the housing for installation or accommodation of the coupling.

Referring now to the drawings in detail, the embodiment illustrated in FIGS. 1 and 2 has a drive shaft 1 of the hydrostatic coupling rigidly connected with a two-part coupling housing 2, 3. A driven shaft 4 projects into the coupling housing 2, 3 from that side opposite the shaft 1. The front end of the drive shaft 4 is journalled in the housing part 2 by means of a roller bearing 5 and serves, for instance, in turn as the drive shaft for a non-illustrated drive unit. The shaft 4 is sealed off outwardly by means of a ring or annular seal 6 inserted in the housing part 3. In the interior of the housing 2, 3, the parts of which are interconnected by screws 7, a gear 8 is positively seated upon the shaft 4. This gear 8 engages in a recess 9 of a center plate 10 which is arranged in the interior of the housing 2, 3 and corresponds in thickness with that of the gear 8. Radially adjacent the gear 8, three gears 14, 15, and 16 are journalled in corresponding recesses 11, 12, and 13 of the center plate 10. These gears 14, 15, and 16 mesh with the gear 8 and are journalled by means of bolts 17, which are arranged in the housing 2, 3, as well as by suitable roller bearings 21. With this arrangement, the gear 8 serves as a sun wheel or gear, while the other gears 14, 15, and 16 form planetary gears. Under these circumstances, the housing 2, 3 itself serves as a carrier or support of the planetary gears. The three gears 14, 15, and 16, together with the central sun gear 8, respectively form a geared pump, the suction and pressure passages of which are designated by reference numerals 19 and 19' respectively. To radially seal the gears 8 and 14 through 16, these gears are provided with two or three sealing elements 20 which are seated or fitted in suitable recesses of the center plate 10. On the left side of gears 8 and 14 through 16 in FIG. 1, there is arranged a sealing plate 22 which covers the circulation passages 18, 19, respectively and the gears in the region of the pressure field. This sealing plate 22 is fastened by means of rivets 24 to a support or holding plate 23 which is axially shiftably journalled on the bolts 17. Near the periphery of the holding plate 23, several pressure or compression springs 25 are arranged between this holding plate 23 and the part 2 of the housing. These compression springs 25 hold the sealing plate 22 in the illustrated position of engagement. Pins or push rods 27 engage or act on the holding plate 23 for axial operation of the sealing plate 22. The push rods 27 are guided parallel to the shaft 4 in bores 28 in the center plate 10 as well as in the housing part 3. For sealing-off the annular gap between the pins or push rods 27 as well as their guide bores 28, seals 29 inserted in the housing part 3 are provided. On the drive side, a pressure disc or plate 30 is arranged on the coupling housing 2, 3. Screws 31, which engage the pins or push rods 27 and are axially shiftable, are mounted in the pressure plate 30. A pressure ring 34, which is axially shiftable upon a guide tube 33, is seated laterally of the plate 30. A pressure housing 36 for actuation of the coupling acts on the pressure ring 34 by way of a thrust bearing 35 and is likewise axially shiftable upon the guide tube 33.

For aiding the compression springs 25 during pressing of the sealing plate 22 against the gears 8 and 14 through 16, as well as against the center plate 10, several hydraulic working pistons 38 are provided. These pistons 38 are arranged in cylindrical recesses 39 in the interior of the housing part 2. A support ring 40 and an O-ring or sealing ring 41 arranged adjacent thereto serve for guiding and sealing the working pistons 38. Each working piston 38 is secured against rotation by a clamping sleeve 42. A passage 43 serves to connect the cylinder-like recess 39 respectively, with the suction and pressure passages 18 and 19, respectively. With a hydraulic coupling having such pairing of gears, depending upon the direction of rotation, three of the six passages 18, 19, respectively provided for circulation of the pressure medium correspondingly represent either a suction side or a pressure side. So that during operation of the coupling the pressing forces exerted by the working pistons 38 upon the sealing plate 22 are effective not only during driving torques but rather also during torques to be transmitted to the braking motor, working pistons 38 are provided, respectively, which are connected correspondingly not only with the passages 18 but also with the passages 19. A radial filler plug 44 is located in the housing 2, 3 of the coupling for introduction of the pressure medium into the interior of the coupling.

When the motor is being driven, the pertaining pressure side of the geared pumps, in conformity with the direction of rotation of the coupling housing 2, 3, is respectively located in the direction of rotation adjoining the gear engagement. During uncoupling, the pressure ring 34 is acting upon the pressure plate 30 and consequently, by means of the pins or push rods 27, shifts the holding plate 23 against the compression springs 25. The actuation path is positively terminated when the holding plate 23 strikes inside against the coupling housing 2. In the uncoupled condition, the pressure medium can flow back again through the gap between the sealing plate 22 and the gears 8 and 14 through 16 or the center plate 10 directly into the respective gear chambers from which it shortly before was displaced. Consequently no pressure can build up, so that the sun gear 8 is not taken along. By this type of actuation, the residual moment of the coupling is small, and is only caused by friction between the gears 8 and 14 through 16 as well as the housing part 3.

During coupling the compression springs 25 press the sealing plate 22 lightly against the gears 8 and 14 through 16 as well as the center plate 10. Since the displaced pressure medium can no longer discharge or flow away freely, a hydrostatic pressure builds up. Consequently, the planetary gears 14, 15, and 16 can no longer move freely upon the sun gear 8. Rather, the coupling housing 2, 3, the planetary gears 14, 15, and 16, and the sun gear 8 rotate in a closed manner when no leakage oil discharges or flows away. Accordingly, the drive moment is transferred onto the sun gear 8 by way of the hydrostatic pressure.

With the inventive hydrostatic coupling, because of the compact manner of construction, good conditions for accommodating the coupling in the flywheel of a prime mover exist already at relatively low working pressures.

The present invention is, of course, in no way restricted to the specific disclosure of the specification and drawings, but also encompasses any modifications within the scope of the appended claims.

What we claim is:

1. A hydrostatic coupling, which comprises:
a first coupling shaft;
a housing fastened on said first coupling shaft and including a plurality of recesses;
a second coupling shaft associated with said housing;
a first gear, serving as a sun gear and secured on said second coupling shaft; and
a plurality of further gears, which are contained in at least some of said recesses and are arranged in a planetary manner about said first gear in such a way as to include circulation passages, said first gear forming a geared pump with each of said further planetary gears and driving same; a sealing plate which is externally axially adjustable against spring force, and in which said housing has a smooth inner wall, said first sun gear and said further planetary gears on the one hand engaging said smooth inner wall of said housing, and on the other hand engaging said sealing plate, which, in conformity with the axial adjustment, at least partially closes said circulation passages.

2. A hydrostatic coupling according to claim 1, which includes a support plate and springs which support said support plate in said housing, said sealing plate being fastened to said support plate.

3. A hydrostatic coupling according to claim 2, which includes a pressure plate, bores in said housing, and, for adjusting said sealing plate, a plurality of push rods which are guided in said bores through said housing inwardly to said support plate, and which externally engage said pressure plate for operation.

4. A hydrostatic coupling according to claim 3, which includes a plurality of working pistons, which are acted on by the operating pressure of said geared pumps, and which engage said sealing plate for closing same.

5. A hydrostatic coupling according to claim 1, in which each of said planetary gears has at least two sealing elements engaging radially thereagainst, and said sun gear has at least three sealing elements engaging radially thereagainst.

6. A hydrostatic coupling according to claim 1, in which the radius of said planetary gears coincides with that of said sun gear.

7. A hydrostatic coupling according to claim 1, which includes at least one pressure limiting valve for said geared pumps for the purpose of avoiding torque peaks.

8. A hydrostatic coupling according to claim 1, which is associated with a prime mover having a flywheel, said flywheel serving as the housing for accommodating said coupling.

9. A hydrostatic coupling, which comprises in combination therewith:

a first coupling shaft;

a housing fastened on said first coupling shaft and including a plurality of recesses;

a second coupling shaft associated with said housing;

a first gear, serving as a sun gear and secured on said second coupling shaft;

a plurality of further gears, which are contained in at least some of said recesses and are arranged in a planetary manner about said first gear in such a way as to include circulation passages, said first gear forming a geared pump with each of said further planetary gears and driving same;

a sealing plate which is axially adjustable against resilient force and which in conformity with the axial adjustment, at least partially closes said circulation passages; and a plurality of working pistons which are acted on by operating pressure of said geared pumps dependent upon rotational direction of operation to effect engagement of said sealing plate for closing of circulation passages alternately for pressure and suction sides of pressure medium to assure reliable transfer of torques by the hydrostatic coupling during drive operation and brake operation therewith.

* * * * *